United States Patent Office 3,535,293
Patented Oct. 20, 1970

3,535,293
HIGH-STRENGTH PRESSURE-SENSITIVE
ADHESIVES
Carl C. Anderson, Gibsonia, Pa., assignor to PPG Industries, Inc., Pittsburgh, Pa., a corporation of Pennsylvania
No Drawing. Continuation-in-part of application Ser. No. 688,965, Dec. 8, 1967. This application Aug. 6, 1969, Ser. No. 848,117
Int. Cl. C08f 15/00, 15/40
U.S. Cl. 260—78.5                    18 Claims

ABSTRACT OF THE DISCLOSURE

Interpolymers which are useful as pressure-sensitive adhesives having improved toughness and cohesive strength are obtained by including in the interpolymer an N-(1,1-dimethyl-3-oxobutyl)-substituted unsaturated carboxylic acid amide. The interpolymer preferably also contains carboxylic acid units and vinyl ester units, as well as interpolymerized alkyl acrylates or methacrylates. These adhesives have improved adhesion, cohesive strength and toughness, as compared to corresponding adhesives without the substituted amide component, and are particularly useful on adhesive-coated foam material, such as foam mounting strips.

---

This application is a continuation-in-part of our copending application Ser. No. 688,965, filed Dec. 8, 1967, now abandoned.

Normally tacky adhesives which are adherent upon application of light finger pressure and which also can be easily removed from the surfaces to which they are applied are known as pressure-sensitive adhesives. In order to function satisfactorily as a pressure-sensitive adhesive, a material must have a reasonable balance of three properties: tack, adhesion and cohesive strength. Furthermore, the adhesion must develop instantaneously when applied to substrates of differing characteristics, and the bond must retain sufficient adhesive and cohesive strength over a period of time and under varying environmental conditions.

One of the usual requirements for a pressure-sensitive adhesive is that it be cleanly removable from the substrate, and thus the adhesive bond formed by such an adhesive is inherently of low relative strength as compared, for instance, to a thermosetting resin bond. Pressure-sensitive adhesives in general also tend to lose strength when under load for extended periods of time. Such deficiencies have limited the utility of pressure-sensitive adhesives in many applications.

Typical pressure-sensitive adhesives are composed of a rubbery elastomer combined with a liquid or solid resin tackifier. While such adhesives are desirable for certain common types of applications, their properties are unsuitable for many demanding large-scale industrial uses. More recently, acrylic resins have been employed as pressure-sensitive adhesives and provide improved properties, particularly in providing stronger bonds. Even these newer adhesives, however, have not proven completely satisfactory; one continuing problem is their tendency to lose strength upon aging.

It has now been found that pressure-sensitive adhesives having greatly improved properties, including high cohesive strength and improved strength retention, are provided by interpolymers formed from monomers which include an N-(1,1-dimethyl-3-oxobutyl)-substituted unsaturated carboxylic acid amide. Adhesives based upon interpolymers of this type have improved adhesive and cohesive strength as well as sufficient tack; moreover, such adhesives retain their properties in use over longer periods of time and to a much higher extent than do conventional pressure-sensitive adhesives.

The N - (1,1 - dimethyl-3-oxobutyl)-substituted amide component of the interpolymers herein is preferably the substituted acrylamide or methacrylamide, but there can also be utilized corresponding polymerizable derivatives of other $\alpha,\beta$ ethylenically unsaturated carboxylic acid amides, such as crotonamide and the amides of itaconic acid, maleic acid, and fumaric acid. Mixtures of several N-(1,1-dimethyl-3-oxobutyl)-substituted amides can also be employed. The preferred amide compound is N-(1,1-dimethyl-3-oxobutyl) acrylamide, which is commercially available.

The proportion of substituted amide in the interpolymer is varied, depending on the particular monomers employed and the specific properties desired. However, in most cases, the amount is between about 0.5 percent and about 20 percent by weight of the total interpolymer. The preferred adhesives, and especially those containing N-(1,1-dimethyl-3-oxobutyl) acrylamide, ordinarily contain the substituted amide in an amount between about 1 and about 10 percent by weight.

The composition of the remainder of the interpolymer is not critical. This invention may be practiced with those monomers or mixtures of monomers which, by themselves, can be polymerized to tacky pressure-sensitive adhesives. Any ethylenic monomer or mixture of monomers copolymerizable with the substituted amide and capable of forming pressure-sensitive adhesives when used without the substituted amide can be utilized, provided the other desired properties, such as tack are obtained. In most cases, a substantial proportion of the interpolymer is made up of one or more esters of unsaturated acids such as alkyl esters of acrylic acid or methacrylic acid and mixtures of alkyl acrylates and vinyl esters; mixtures of alkyl acrylates and dialkyl esters of fumaric or maleic acid; mixtures of alkyl acrylates and vinyl ethers; mixtures of alkyl acrylates and vinyl pyrrolidone and mixtures of alkyl acrylates and one or more polar compounds such as acyclic acid. Such monomers may make up the entire balance of the interpolymer but preferably constitute from about 35 percent to about 80 percent of the total weight of the interpolymer.

The particular esters of unsaturated acids employed depend upon the amount and nature of the other monomers, and can include essentially any polymerizable alkyl acrylate or methacrylate, having, for instance, from 1 to about 20 carbon atoms or more in the alkyl group. Preferred are alkyl acrylates and alkyl methacrylates having from about 4 to about 12 carbon atoms in the alkyl group. Examples of such compounds include butyl acrylate, butyl methacrylate, hexyl acrylate, hexyl methacrylate, 2-ethylhexyl acrylate, decyl acrylate, lauryl methacrylate and similar monomers. Various other alkyl acrylates and methacrylates can also be included, such as methyl acrylate, ethyl acrylate, methyl methacrylate, propyl methacrylate, octadecyl acrylate, etc. Substituted alkyl acrylates and methacrylates, particularly cyanoalkyl esters, are in some cases desirably included.

Another class of preferred monomers included in the interpolymer are the vinyl esters of saturated carboxylic acids to regulate the tack and adhesion of the material. Examples are vinyl acetate, which is most often used, vinyl propionate and vinyl butyrate. Such vinyl esters are preferably present in an amount corresponding to about 10 to 60 percent of the total weight of the interpolymer.

It is also preferred to include in the interpolymer a minor proportion of carboxylic acid units, as provided, for example, by interpolymerized unsaturated carboxylic acid. The inclusion of such acid units is often necessary in order to attain the desired level of performance in the adhesive, since there appears to be an interaction between the acid units and the substituted amide groups which results in much better properties than can be achieved with either alone. Acrylic acid and methacrylic acid are among the preferred acids, as are half esters of unsaturated dicarboxylic acids, such as maleic acid and fumaric acid. Methyl hydrogen fumarate, butyl hydrogen fumarate, methyl hydrogen maleate and butyl hydrogen maleate are examples of compounds of this type. Other polymerizable acids, such as crotonic acid, maleic acid, itaconic acid and fumaric acid, can also be employed. An interpolymerized acid is usually present in an amount within the range of from about 0.5 percent to about 20 percent of the total weight of the interpolymer.

While the preferred interpolymers contain unsaturated acid, alkyl acrylates or methacrylates and/or vinyl esters, other ethylenically unsaturated monomers copolymerizable with the substituted amide can also be utilized. In some instances the interpolymer may be composed entirely of these other monomers (in addition to the substituted amide), but more usually a mixture of monomers including the preferred monomers along with other monomers can be used. Such other monomers can be of widely varying types, including, for example, mono-olefinic hydrocarbons, such as styrene and vinyl toluene; halogenated mono-olefinic hydrocarbons, such as vinyl chloride and vinylidene chloride; unsaturated esters, such as isopropyl acetate and dimethyl maleate; and dienes, such as 1,3-butadiene. The monomers may include those containing various functional groups, although such monomers are ordinarily employed in relatively small amounts, if at all. Examples of functional monomers include 2-hydroxyethyl acrylate and methacrylate and similar hydroxyalkyl esters of unsaturated carboxylic acids, unsaturated alcohols, such as allyl alcohol, and amino-containing monomers, including aminoalkyl esters such as aminoethyl methacrylate and N-methyl aminoethyl acrylate.

As indicated above, the interpolymers herein are normally tacky to some extent and the composition of the interpolymer is chosen so as to provide a product of suitable properties including tack. Tack is related to the plasticity of the polymer, which is a measure of the deformability of the polymer under an applied load. The plasticity of the interpolymer (as measured by the standard Williams plasticity number) is generally within the range of from about 1.3 to about 3.5. Where the plasticity is above 3.5, added tackifiers may be necessary.

The adhesive is essentially composed of an interpolymer as described above, or a mixture of polymers which provides an average composition as described. The adhesive is usually contained in an organic solvent, although water-dispersed or emulsified adhesive of this type can also be provided if desired. The solvent can be any solvent in which the interpolymer is soluble or dispersible. Esters such as ethyl acetate, ketones such as methyl ethyl ketone, and alcohols such as isopropyl alcohol, are among the solvents ordinarily employed, but others can be utilized if desired.

There can also be included in the adhesive composition additive materials which do not affect the basic properties of the adhesive. Fillers, tackifiers, antioxidants, stabilizers and the like are thus sometimes added to the formulated adhesive.

The adhesive can be employed in various forms. For instance, it can be cast as a free film, interleaved between sheets of release paper, and employed in a transfer operation. In other methods, the adhesive is coated onto a backing member and dried to provide pressure-sensitive coated sheet material, such as tapes, sheets or panels. Cellophane, vinyls, cloth, Mylar, rubber, various laminates, and other such flexible materials, as well as wood, metal, hardboard and other less flexible backings, can be coated in this manner. In some cases, the adhesive can be used as a dispersion or in solution as a liquid adhesive and applied just prior to use.

A particularly advantageous use of the present adhesives is on cellular, compressible, resilient materials, such as foam strips used for insulating or mounting strips or for similar purposes. The adhesive can be on one or both sides of the foam, which is usually polyvinyl chloride foam or polyurethane foam; other foams, including rubber foam, etc. can also be used. The high cohesive strength and long term holding ability of the adhesives herein make them especially desirable in these applications.

There are set forth below several examples which serve to illustrate the invention in certain of its embodiments. All parts and percentages in the examples, as well as throughout this specification, are by weight and are based upon nonvoltaile solids unless otherwise indicated.

EXAMPLE 1

The following monomer mixtures were employed in preparing an adhesive:

| | Parts by Weight | |
|---|---|---|
| | Mixture A | Mixture B |
| 2-ethylhexyl acrylate | 45 | 90 |
| Acrylic acid | 2 | 4 |
| Vinyl acetate | 48 | 96 |
| N-(1,1-dimethyl-3-oxobutyl)acrylamide | 5 | 10 |
| Ethyl acetate | 50 | 75 |
| Benzoyl peroxide | 0.7 | 0.4 |

A reaction vessel was charged with Mixture A and heated with a slow nitrogen sparge to reflux. After refluxing for 30 minutes, Mixture B was added slowly over a one hour period. Heating was continued with refluxing for three hours with the incremental addition of 200 parts of ethyl acetate during the first hour to maintain viscosity and the addition of 0.4 part of benzoyl peroxide in 100 parts of ethyl acetate slowly during the second hour. During the third hour 50 parts of ethyl acetate were added. The mixture was then cooled and 100 parts of isopropyl alcohol were added. The product obtained had a total nonvolatile solids content of 32.1 percent, a Gardner-Holdt viscosity of Z4–Z5, and a Williams plasticity number of 3.35.

The adhesive thus produced had outstanding properties, as shown, for example, by comparison with a corresponding adhesive made in a similar manner from the same monomer mixture except that the substituted amide was omitted and replaced with vinyl acetate. The comparative properties of the adhesives were illustrated by several tests carried out as follows:

Tack.—The Rolling Ball Tack test promulgated by the Pressure-Sensitive Tape Council is used; in this test a 2-gram stainless steel ball was rolled onto a 1 mil thick dry film of the adhesive from a 2-inch long V-shaped channel inclined at a 20-degree angle and brought to the horizontal through a 1 inch section. The distance the ball travels over the film before stopping is a measure of the tack; the shorter the distance, the greater the tack. The results are reported in units of $\frac{1}{16}$ inch.

Adhesion.—The adhesive was coated on samples of 8-mil thick vinyl sheet (polyvinyl chloride) at a dry film weight of 0.006–0.008 gram per square inch. The coated vinyl samples were then applied to steel panels with a hand roller. After 15 minutes, the peel strength was measured at an angle of 180 degrees and a peel rate of 12 inches per minute. The results are reported in grams per inch of width of the vinyl sheet.

Dead Load Test.—Adhesive coated vinyl samples were prepared as in the adhesion test described above and applied to steel panels with a ½ inch by ½ inch overlap joint. A two pound weight was suspended from the vinyl with the steel panel maintained vertically and the time until separation occurred was measured. This test is a measure of the cohesive strength and the retention of such strength over a period of time.

The results of the above tests carried out with the adhesive of Example 1 and the comparative adhesive made without N-(1,1-dimethyl-3-oxobutyl)acrylamide are shown in Table I.

TABLE I

| Adhesive | Tack | Adhesion | Dead load, hrs. |
|---|---|---|---|
| Example 1 | 88 | 630 | 216 |
| Comparative | 31 | 520 | 2.5 |

As indicated by the above data, the adhesive made with N-(1,1-dimethyl-3-oxobutyl)acrylamide had at least as good adhesion and significantly better strength, while maintaining sufficient tack.

It is significant to note that polymers containing N-(1,1-dimethyl-3-oxobutyl)-substituted amides have unique advantages which are not found even in polymers containing closely related amides. This was demonstrated by comparing the adhesive polymer of Example 1 with corresponding polymers made with other amides in place of N-(1,1-dimethyl-3-oxobutyl)acrylamide. The results are in Table II:

TABLE II

| Amide | Tack | Adhesion | Dead load |
|---|---|---|---|
| N-(1,1-dimethyl-3-oxobutyl)acrylamide | 88 | 630 | 216 |
| N-tertiary butyl acrylamide | 80 | 525 | 8 |
| Methacrylamide | None | 68 | |
| Acrylamide | (Gelled during preparation) | | |
| None | 31 | 520 | 2. |

EXAMPLE 2

Following the general procedure given in Example 1, a series of adhesives were produced with varying amounts of N-(1,1-dimethyl-3-oxobutyl)acrylamide; the compositions of the adhesives and the results obtained in the above Dead Load and Tack tests are shown in Table III:

TABLE III

| Amide | Monomer composition (percent by weight) | | | Tack | Dead load, hours |
|---|---|---|---|---|---|
| | Vinyl acetate | 2-ethylhexyl acrylate | Acrylic acid | | |
| 0 | 46 | 52 | 2 | 20 | 5 |
| 1 | 45 | 52 | 2 | 20 | 19 |
| 5 | 43 | 50 | 2 | 36 | 102 |
| 10 | 41 | 47 | 2 | 73 | 13 |

As indicated by the above results, the adhesives containing N-(1,1-dimethyl-3-oxobutyl)acrylamide have markedly improved strength over that not containing this monomer, with the optimum amount of N-(1,1-dimethyl-3-oxobutyl)acrylamide for this particular adhesive polymer being at about 5 percent. In other cases, the optimum concentration of substituted amide varies somewhat, with some improvement being noted over a wide range as indicated hereinabove. It may also be noted that even the adhesive containing 10 percent of the amide had a high degree of tack.

As mentioned above, one advantageous use for the adhesives of the present invention is on foams to provide insulating materials, mounting strips and the like. Illustrating this embodiment of the invention is the following example.

EXAMPLE 3

A 1/16 inch thick sample of polyvinyl chloride foam of the type employed in foam mounting strips was coated on both sides with a 2 mil dry film of adhesive composition of Example 1. The adhesive was applied by a transfer operation in which the adhesive was coated on release paper, dried for 2 minutes at 300° F., and the dried film applied to the foam. A circular section of the coated foam, 2 inches in diameter, was cut and applied to the bottom of a one kilogram brass weight, the bottom being of similar shape and size. This assembly was then mounted on a vertical, painted wall surface and allowed to hang. The weight remained in place for several weeks with no indication of failure, until it was intentionally removed.

Similar results to those described are obtained using other adhesive polymers of the class described. For instance, N-(1,1-dimethyl-3-oxobutyl)methacrylamide can be substituted for the substituted acrylamide in the above illustrated polymers, and other unsaturated acids can be used, such as methacrylic acid, methyl hydrogen fumarate, and the others mentioned above. Similarly, the other components of the adhesive polymer are not critical insofar as obtention of improved properties by the inclusion of N-(1,1-dimethyl-3-oxobutyl)-substituted amide is concerned, provided that the other components are copolymerizable with the substituted amide.

According to the provisions of the patent statutes, there are described above the invention and what are now considered to be its best embodiments. However, within the scope of the appended claims, it is to be understood that the invention can be practiced otherwise than as specifically described.

I claim:
1. A pressure-sensitive, normally tacky adhesive comprising an interpolymer consisting essentially of
    component (A) from about 0.5 percent to about 20 percent by weight of at least one polymerizable N-(1,1-dimethyl-3-oxobutyl)-substituted α,β ethylenically unsaturated carboxylic acid amide, and
    component (B) from about 99.5 percent to about 80 percent by weight of one or more copolymerizable ethylenically unsaturated monomers,
    wherein said component (B) contains at least one ester of an unsaturated acid and said component (B) is capable of forming a pressure-sensitive adhesive when used alone.
2. The adhesive of claim 1 in which said substituted amide is N-(1,1-dimethyl-3-oxobutyl)acrylamide or N-(1,1-dimethyl-3-oxobutyl)methacrylamide.
3. The adhesive of claim 1 in which said interpolymer includes from about 0.5 percent to about 20 percent, based on the total weight of the interpolymer, of ethylenically unsaturated carboxylic acid.
4. The adhesive of claim 3 in which said acid is acrylic or methacrylic acid.
5. The adhesive of claim 3 in which said acid is a lower alkyl monoester of maleic acid or fumaric acid.
6. The adhesive of claim 1 in which said interpolymer includes at least about 35 percent, based on the total weight of the interpolymer, of one or more alkyl esters of acrylic acid or methacrylic acid.
7. The adhesive of claim 6 in which said alkyl ester contains from about 4 to about 12 carbon atoms in the alkyl group.
8. The adhesive of claim 1 in which said interpolymer includes a vinyl ester of a saturated carboxylic acid.
9. The adhesive of claim 8 in which said vinyl ester is vinyl acetate.
10. A pressure-sensitive, normally tacky adhesive comprising an interpolymer consisting essentially of
    component (A) from about 1 percent to about 10 percent by weight of polymerizable N-(1,1-dimethyl-3-oxobutyl)-substituted α,β ethylenically unsaturated carboxylic acid amide,
    component (B) from about 0.5 to about 20 percent by weight of polymerizable unsaturated carboxylic acid,
    component (C) from about 35 percent to about 80 percent by weight of one or more alkyl acrylates in which the alkyl groups have a carbon chain of from about 4 to about 12 carbon atoms, and
    component (D) from about 10 to about 60 percent by weight of polymerizable vinyl ester of a saturated carboxylic acid.

11. A pressure-sensitive, normally tacky adhesive comprising an interpolymer consisting essentially of
component (A) from about 1 percent to about 10 percent by weight of N-(1,1-dimethyl-3-oxobutyl)acrylamide,
component (B) from about 0.5 to about 20 percent by weight of polymerizable unsaturated carboxylic acid,
component (C) from about 35 percent to about 80 percent by weight of one or more alkyl acrylates in which the alkyl groups have a carbon chain of from about 4 to about 12 carbon atoms, and
component (D) from about 10 to about 60 percent by weight of polymerizable vinyl esters of a saturated carboxylic acid.

12. A pressure-sensitive, normally tacky adhesive comprising an interpolymer consisting essentially of
component (A) from about 1 percent to about 10 percent by weight of N-(1,1-dimethyl-3-oxobutyl)methacrylamide,
component (B) from about 0.5 to about 20 percent by weight of polymerizable unsaturated carboxylic acid,
component (C) from about 35 percent to about 80 percent by weight of one or more alkyl acrylates in which the alkyl groups have a carbon chain of from about 4 to about 12 carbon atoms, and
component (D) from about 10 to about 60 percent by weight of copolymerizable vinyl esters of a saturated carboxylic acid.

13. A pressure-sensitive adhesive-coated article comprising a backing member having thereon a layer of the adhesive of claim 1.

14. The adhesive-coated article of claim 13 in which said backing member is a cellular, compressible organic foam material.

15. Pressure-sensitive adhesive-coated material comprising a backing member having thereon a layer of the adhesive of claim 10.

16. The adhesive of claim 1 in which said substituted amide is N-(1,1-dimethyl-3-oxobutyl)crotonamide.

17. The adhesive of claim 10 in which said substituted amide is N-(1,1-dimethyl-3-oxobutyl)methacrylamide.

18. The adhesive of claim 10 in which said substituted amide is N-(1,1-dimethyl-3-oxobutyl)crotonamide.

References Cited

UNITED STATES PATENTS

| | | | |
|---|---|---|---|
| 3,231,533 | 2/1966 | Garrett | 260—78.5 |
| 3,321,431 | 5/1967 | McNab et al. | 260—29.6 |
| 3,321,451 | 5/1967 | Gander | 260—86.1 |
| 3,400,103 | 9/1968 | Samour et al. | 260—78 |

JOSEPH L. SCHOFER, Primary Examiner

J. KIGHT III, Assistant Examiner

U.S. Cl. X.R.

117—122, 127, 138.8, 139, 147, 152, 161; 260—29.1, 29.6, 31.2, 32.8, 33.4, 78, 80.73, 85.7, 86.1